US010298368B2

United States Patent
Gao

(10) Patent No.: US 10,298,368 B2
(45) Date of Patent: May 21, 2019

(54) METHOD AND DEVICE FOR HANDLING INTER-CELL INTERFERENCE, CONTROL APPARATUS, AND BASE STATION

(71) Applicant: Huawei Technologies Co., Ltd., Shenzhen, Guangdong (CN)

(72) Inventor: Xiujuan Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 15/581,421

(22) Filed: Apr. 28, 2017

(65) Prior Publication Data
US 2017/0230153 A1 Aug. 10, 2017

Related U.S. Application Data

(63) Continuation of application No. PCT/CN2015/080672, filed on Jun. 3, 2015.

(30) Foreign Application Priority Data

Oct. 31, 2014 (CN) .......................... 2014 1 0608025

(51) Int. Cl.
*H04L 5/00* (2006.01)
*H04W 72/12* (2009.01)
*H04B 17/345* (2015.01)

(52) U.S. Cl.
CPC ....... *H04L 5/0032* (2013.01); *H04W 72/1226* (2013.01); *H04W 72/1231* (2013.01); *H04B 17/345* (2015.01); *H04W 72/1278* (2013.01)

(58) Field of Classification Search
CPC ........... H04W 72/042; H04W 72/0446; H04W 72/0413; H04W 72/1231; H04L 5/0048; H04L 5/0053; H04L 5/0032
See application file for complete search history.

(56) References Cited

U.S. PATENT DOCUMENTS

2004/0022207 A1\* 2/2004 Leung .................... H04L 1/206
370/321
2011/0014909 A1 1/2011 Han et al.
(Continued)

FOREIGN PATENT DOCUMENTS

CN 101960794 A 1/2011
CN 101971661 A 2/2011
(Continued)

OTHER PUBLICATIONS

Sahlin, Henrik, "Channel Prediction for Link Adaptation in LTE Uplink," IEEE, 2012, 5 pages.

*Primary Examiner* — Jamal Javaid

(57) ABSTRACT

The present invention discloses a method, includes: managing a first cell, obtaining resource scheduling information of a neighboring cell of the first cell in a first time interval, and determining an interference level of inter-cell interference of the first cell according to the obtained resource scheduling information; and measuring an inter-cell interference value of the first cell in a second time interval, and storing the measured inter-cell interference value of the first cell in the second time interval by using the interference level as an index, where the interference level is determined according to the resource scheduling information in the first time interval. Based on a stored correlation between an interference level and a real inter-cell interference value obtained by means of measurement, the first base station can quickly and accurately predict a future inter-cell interference value by determining an interference level of inter-cell interference.

12 Claims, 4 Drawing Sheets

(56) References Cited

U.S. PATENT DOCUMENTS

| | | |
|---|---|---|
| 2011/0117967 A1 | 5/2011 | Vedantham et al. |
| 2011/0183679 A1 | 7/2011 | Moon et al. |
| 2013/0051359 A1 | 2/2013 | Skarby |
| 2013/0121186 A1 | 5/2013 | Vajapeyam et al. |
| 2013/0208604 A1 | 8/2013 | Lee et al. |
| 2014/0051440 A1 | 2/2014 | Machida |

FOREIGN PATENT DOCUMENTS

| | | |
|---|---|---|
| CN | 102377698 A | 3/2012 |
| CN | 102860113 A | 1/2013 |
| CN | 103733676 A | 4/2014 |
| EP | 2140572 | 1/2010 |
| EP | 2262336 A1 | 12/2010 |
| EP | 2096807 B1 | 4/2012 |
| JP | 2011071994 A | 4/2011 |
| JP | 2011151779 A | 8/2011 |
| JP | 2013085247 A | 5/2013 |
| KR | 20140094004 A | 7/2014 |
| WO | 2007007662 A1 | 1/2007 |
| WO | 2008130297 A1 | 10/2008 |
| WO | 2012160683 A1 | 11/2012 |

\* cited by examiner

METHOD AND DEVICE FOR HANDLING INTER-CELL INTERFERENCE, CONTROL APPARATUS, AND BASE STATION

CROSS-REFERENCE TO RELATED APPLICATIO

This application is a continuation of International Application No. PCT/CN2015/080672, filed on Jun. 3, 2015, which claims priority to Chinese Patent Application No. 201410608025.X, filed on Oct. 31, 2014. The disclosures of the aforementioned applications are hereby incorporated by reference in their entireties.

TECHNICAL FIELD

The present invention relates to the field of wireless communications technologies, and in particular, to a method and a device for handling inter-cell interference, a control apparatus, and a base station.

BACKGROUND

In a Long Term Evolution (LTE) system, when uplink scheduling is performed, user equipment sends a sounding reference signal (SRS) to a base station, and the base station estimates a signal to interference plus noise ratio (SINR) of a cell during uplink transmission according to uplink channel quality determined at a time point of receiving the SRS, schedules an uplink transmission resource for the user equipment at a scheduling time point, and determines a modulation and coding scheme used by the user equipment during uplink transmission.

Generally, the uplink channel quality determined at the time point of receiving the SRS may be used directly to estimate the SINR of the cell during uplink transmission. However, considering that a time delay exists between the time point of receiving the SRS, the scheduling time point and an uplink transmission time point, a considerable error may exist between the uplink channel quality determined at the time point of receiving the SRS and actual uplink channel quality during uplink transmission. Consequently, accuracy of the estimated SINR of the cell is relatively low, and performance of uplink scheduling is affected. Therefore, the channel quality during uplink transmission may be predicted based on the channel quality determined at the time point of receiving the SRS, so as to improve accuracy of the estimated SINR of the cell.

During research, the prior art has the following disadvantages: the SINR of the cell is not only related to channel quality, but also related to inter-cell interference. When the inter-cell interference fluctuates greatly at different time points, the estimated SINR of the cell may still be inaccurate even if the channel quality during uplink transmission is predicted based on the channel quality determined at the time point of receiving the SRS.

SUMMARY

In view of this, embodiments of the present invention provide a method and a device for handling inter-cell interference, a control apparatus, and a base station, to relieve impact caused by fluctuation of inter-cell interference on SINR estimation accuracy.

According to a first aspect of the present invention, a method for handling inter-cell interference is provided, where the method is applied to a first base station, the first base station manages a first cell, and the method includes:

obtaining resource scheduling information of a neighboring cell of the first cell in a first time interval, where the resource scheduling information is used to represent a resource scheduling result of the neighboring cell in the first time interval;

determining an interference level of inter-cell interference of the first cell according to the obtained resource scheduling information in the first time interval;

measuring an inter-cell interference value of the first cell in a second time interval, where the second time interval is later than the first time interval; and storing the measured inter-cell interference value of the first cell in the second time interval by using the interference level as an index, where the interference level is determined according to the resource scheduling information in the first time interval.

With reference to a possible implementation manner in the first aspect of the present invention, in a first possible implementation manner, the obtaining resource scheduling information of a neighboring cell of the first cell in a first time interval includes:

sending a request message to a second base station, where cells managed by the second base station include the neighboring cell of the first cell; and receiving the resource scheduling information of the neighboring cell of the first cell in the first time interval, where the resource scheduling information is sent by the second base station; or reading resource scheduling information of a second cell in the first time interval, where the first base station manages the second cell, and the second cell is the neighboring cell of the first cell.

With reference to a possible implementation manner in the first aspect of the present invention, or with reference to the first possible implementation manner in the first aspect of the present invention, in a second possible implementation manner, the resource scheduling result of the neighboring cell in the first time interval includes: a user is scheduled in a first resource location, or no user is scheduled in a first resource location, where the first resource location in the neighboring cell and the first resource location in the first cell denote a same resource location; and the determining an interference level of inter-cell interference of the first cell according to the obtained resource scheduling information in the first time interval includes:

determining the interference level of the inter-cell interference of the first cell according to a quantity of neighboring cells that have scheduled users in the first resource location; or determining the interference level of the inter-cell interference of the first cell according to a quantity of neighboring cells that have scheduled no user in the first resource location.

With reference to the second possible implementation manner in the first aspect of the present invention, in a third possible implementation manner, when the resource scheduling result of the neighboring cell in the first time interval is: a user is scheduled in the first resource location, and the scheduled user is a strong-interference user, the determining the interference level of the inter-cell interference of the first cell according to a quantity of neighboring cells that have scheduled users in the first resource location includes:

determining the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

With reference to a possible implementation manner in the first aspect of the present invention, or with reference to the first possible implementation manner in the first aspect of the present invention, or with reference to the second possible implementation manner in the first aspect of the present invention, or with reference to the third possible implementation manner in the first aspect of the present invention, in a fourth possible implementation manner, the method further includes:

obtaining resource scheduling information of the neighboring cell of the first cell in a third time interval, where the resource scheduling information is used to represent a resource scheduling result of the neighboring cell in the third time interval;

determining an interference level of inter-cell interference of the first cell according to the obtained resource scheduling information in the third time interval;

measuring an inter-cell interference value of the first cell in a fourth time interval, where the fourth time interval is later than the third time interval; and storing the measured inter-cell interference value of the first cell in the fourth time interval by using the interference level as an index, where the interference level is determined according to the resource scheduling information in the third time interval.

With reference to the fourth possible implementation manner in the first aspect of the present invention, in a fifth possible implementation manner, when the interference level determined according to the resource scheduling information in the first time interval is the same as the interference level determined according to the resource scheduling information in the third time interval, the method further includes:

calculating and storing a statistic value of the inter-cell interference values of the first cell according to the measured inter-cell interference value of the first cell in the second time interval and the measured inter-cell interference value of the first cell in the fourth time interval; or deleting the measured inter-cell interference value of the first cell in the second time interval, where the fourth time interval is later than the second time interval.

According to a second aspect of the present invention, a method for handling inter-cell interference is provided, where the method is applied to a first base station, the first base station manages a first cell, and the method includes:

obtaining resource scheduling information of a neighboring cell of the first cell in a first time interval, where the resource scheduling information is used to represent a resource scheduling result of the neighboring cell in the first time interval;

determining an interference level of inter-cell interference of the first cell according to the obtained resource scheduling information in the first time interval;

reading a stored and historically measured inter-cell interference value of the first cell according to the interference level that is determined according to the resource scheduling information in the first time interval; and estimating inter-cell interference of the first cell in a second time interval by using the read and historically measured inter-cell interference value of the first cell, where the second time interval is later than the first time interval.

With reference to a possible implementation manner in the second aspect of the present invention, in a first possible implementation manner, the stored and historically measured inter-cell interference value of the first cell includes:

an inter-cell interference value of the first cell that is measured by the first base station in one or more historical time intervals, where the inter-cell interference value is pre-stored in the first base station by using an interference level as an index, the interference level is the same as the interference level determined according to the resource scheduling information in the first time interval, and the one or more historical time intervals are all earlier than the second time interval; or a statistic value, calculated and stored by the first base station according to inter-cell interference values of the first cell that are measured in multiple historical time intervals, of inter-cell interference values of the first cell, where the statistic value of the inter-cell interference values of the first cell is pre-stored in the first base station by using an interference level as an index, the interference level is the same as the interference level determined according to the resource scheduling information in the first time interval, and the multiple historical time intervals are all earlier than the second time interval.

With reference to a possible implementation manner in the second aspect of the present invention, or with reference to the first possible implementation manner in the second aspect of the present invention, in a second possible implementation manner, the obtaining resource scheduling information of a neighboring cell of the first cell in a first time interval includes:

sending a request message to a second base station, where cells managed by the second base station include the neighboring cell of the first cell; and receiving the resource scheduling information of the neighboring cell of the first cell in the first time interval, where the resource scheduling information is sent by the second base station; or reading resource scheduling information of a second cell, where the first base station manages the second cell, and the second cell is the neighboring cell of the first cell.

With reference to a possible implementation manner in the second aspect of the present invention, or with reference to the first possible implementation manner in the second aspect of the present invention, or with reference to the second possible implementation manner in the second aspect of the present invention, in a third possible implementation manner, the resource scheduling result of the neighboring cell in the first time interval includes: a user is scheduled in a first resource location, or no user is scheduled in a first resource location, where the first resource location in the neighboring cell and the first resource location in the first cell denote a same resource location; and the determining an interference level of inter-cell interference of the first cell according to the obtained resource scheduling information in the first time interval includes:

determining the interference level of the inter-cell interference of the first cell according to a quantity of neighboring cells that have scheduled users in the first resource location; or determining the interference level of the inter-cell interference of the first cell according to a quantity of neighboring cells that have scheduled no user in the first resource location.

With reference to the third possible implementation manner in the second aspect of the present invention, in a fourth possible implementation manner, when the resource scheduling result of the neighboring cell in the first time interval is: a user is scheduled in the first resource location, and the scheduled user is a strong-interference user, the determining the interference level of the inter-cell interference of the first cell according to a quantity of neighboring cells that have scheduled users in the first resource location includes:

determining the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

With reference to a possible implementation manner in the second aspect of the present invention, or with reference to the first possible implementation manner in the second aspect of the present invention, or with reference to the second possible implementation manner in the second aspect of the present invention, or with reference to the third possible implementation manner in the second aspect of the present invention, or with reference to the fourth possible implementation manner in the second aspect of the present invention, in a fifth possible implementation manner, the method further includes:

calculating a signal to interference plus noise ratio of the first cell in the second time interval in the first resource location according to the estimated inter-cell interference of the first cell in the second time interval.

With reference to the fifth possible implementation manner in the second aspect of the present invention, in a sixth possible implementation manner, the method further includes:

determining, according to the calculated signal to interference plus noise ratio of the first cell in the second time interval, whether to schedule a user in the first resource location of the first cell; or determining, according to the calculated signal to interference plus noise ratio of the first cell, whether to adjust a modulation and coding scheme of a user scheduled in the first resource location of the first cell.

According to a third aspect of the present invention, a device for handling inter-cell interference is provided, where the device is applied to a first base station, the first base station manages a first cell, and the device includes:

an obtaining module, configured to obtain resource scheduling information of a neighboring cell of the first cell in a first time interval, where the resource scheduling information is used to represent a resource scheduling result of the neighboring cell in the first time interval;

a determining module, configured to determine an interference level of inter-cell interference of the first cell according to the obtained resource scheduling information in the first time interval;

a measurement module, configured to measure an inter-cell interference value of the first cell in a second time interval, where the second time interval is later than the first time interval; and a storage module, configured to store the measured inter-cell interference value of the first cell in the second time interval by using the interference level as an index, where the interference level is determined according to the resource scheduling information in the first time interval.

With reference to a possible implementation manner in the third aspect of the present invention, in a first possible implementation manner, the obtaining module is specifically configured to send a request message to a second base station, where cells managed by the second base station include the neighboring cell of the first cell; and receive the resource scheduling information of the neighboring cell of the first cell in the first time interval, where the resource scheduling information is sent by the second base station; or reading resource scheduling information of a second cell in the first time interval, where the first base station manages the second cell, and the second cell is the neighboring cell of the first cell.

With reference to a possible implementation manner in the third aspect of the present invention, or with reference to the first possible implementation manner in the third aspect of the present invention, in a second possible implementation manner, the resource scheduling result of the neighboring cell in the first time interval includes: a user is scheduled in a first resource location, or no user is scheduled in a first resource location, where the first resource location in the neighboring cell and the first resource location in the first cell denote a same resource location; and the determining module is specifically configured to determine the interference level of the inter-cell interference of the first cell according to a quantity of neighboring cells that have scheduled users in the first resource location; or determining the interference level of the inter-cell interference of the first cell according to a quantity of neighboring cells that have scheduled no user in the first resource location.

With reference to the second possible implementation manner in the third aspect of the present invention, in a third possible implementation manner, when the resource scheduling result of the neighboring cell in the first time interval is: a user is scheduled in the first resource location, and the scheduled user is a strong-interference user, the determining module is specifically configured to determine the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

With reference to a possible implementation manner in the third aspect of the present invention, or with reference to the first possible implementation manner in the third aspect of the present invention, or with reference to the second possible implementation manner in the third aspect of the present invention, or with reference to the third possible implementation manner in the third aspect of the present invention, in a fourth possible implementation manner, the obtaining module is further configured to obtain resource scheduling information of the neighboring cell of the first cell in a third time interval, where the resource scheduling information is used to represent a resource scheduling result of the neighboring cell in the third time interval;

the determining module is further configured to determine an interference level of inter-cell interference of the first cell according to the obtained resource scheduling information in the third time interval;

the measurement module is further configured to measure an inter-cell interference value of the first cell in a fourth time interval, where the fourth time interval is later than the third time interval; and the storage module is further configured to store the measured inter-cell interference value of the first cell in the fourth time interval by using the interference level as an index, where the interference level is determined according to the resource scheduling information in the third time interval.

With reference to the fourth possible implementation manner in the third aspect of the present invention, in a fifth possible implementation manner, the storage module is further configured to: when the interference level determined according to the resource scheduling information in the first time interval is the same as the interference level determined according to the resource scheduling information in the third time interval, calculate and store a statistic value of the inter-cell interference values of the first cell according to the measured inter-cell interference value of the first cell in the second time interval and the measured inter-cell interference value of the first cell in the fourth time interval; or delete the measured inter-cell interference value of the first cell in the second time interval, where the fourth time interval is later than the second time interval.

According to a fourth aspect of the present invention, a device for handling inter-cell interference is provided, where the device is applied to a first base station, the first base station manages a first cell, and the device includes:

an obtaining module, configured to obtain resource scheduling information of a neighboring cell of the first cell in a first time interval, where the resource scheduling information is used to represent a resource scheduling result of the neighboring cell in the first time interval;

a determining module, configured to determine an interference level of inter-cell interference of the first cell according to the obtained resource scheduling information in the first time interval; and a processing module, configured to: read a stored and historically measured inter-cell interference value of the first cell according to the interference level that is determined according to the resource scheduling intonation in the first time interval; and estimate inter-cell interference of the first cell in a second time interval by using the read and historically measured inter-cell interference value of the first cell, where the second time interval is later than the first time interval.

With reference to a possible implementation manner in the fourth aspect of the present invention, in a first possible implementation manner, the stored and historically measured inter-cell interference value of the first cell includes:

an inter-cell interference value of the first cell that is measured in one or more historical time intervals, where the inter-cell interference value is pre-stored in the device by using an interference level as an index, the interference level is the same as the interference level determined according to the resource scheduling information in the first time interval, and the one or more historical time intervals are all earlier than the second time interval; or a statistic value, calculated and stored according to inter-cell interference values of the first cell that are measured in multiple historical time intervals, of inter-cell interference values of the first cell, where the statistic value of the inter-cell interference values of the first cell is pre-stored in the device by using an interference level as an index, the interference level is the same as the interference level determined according to the resource scheduling information in the first time interval, and the multiple historical time intervals are all earlier than the second time interval.

With reference to a possible implementation manner in the fourth aspect of the present invention, or with reference to the first possible implementation manner in the fourth aspect of the present invention, in a second possible implementation manner, the obtaining module is specifically configured to send a request message to a second base station, where cells managed by the second base station include the neighboring cell of the first cell; and receive the resource scheduling information of the neighboring cell of the first cell in the first time interval, where the resource scheduling information is sent by the second base station; or read resource scheduling information of a second cell, where the first base station manages the second cell, and the second cell is the neighboring cell of the first cell.

With reference to a possible implementation manner in the fourth aspect of the present invention, or with reference to the first possible implementation manner in the fourth aspect of the present invention, or with reference to the second possible implementation manner in the fourth aspect of the present invention, in a third possible implementation manner, the resource scheduling result of the neighboring cell in the first time interval includes: a user is scheduled in a first resource location, or no user is scheduled in a first resource location, where the first resource location in the neighboring cell and the first resource location in the first cell denote a same resource location; and the determining module is specifically configured to determine the interference level of the inter-cell interference of the first cell according to a quantity of neighboring cells that have scheduled users in the first resource location; or determine the interference level of the inter-cell interference of the first cell according to a quantity of neighboring cells that have scheduled no user in the first resource location.

With reference to the third possible implementation manner in the fourth aspect of the present invention, in a fourth possible implementation manner, when the resource scheduling result of the neighboring cell in the first time interval is: a user is scheduled in the first resource location, and the scheduled user is a strong-interference user, the determining module is specifically configured to determine the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

With reference to a possible implementation manner in the fourth aspect of the present invention, or with reference to the first possible implementation manner in the fourth aspect of the present invention, or with reference to the second possible implementation manner in the fourth aspect of the present invention, or with reference to the third possible implementation manner in the fourth aspect of the present invention, or with reference to the fourth possible implementation manner in the fourth aspect of the present invention, in a fifth possible implementation manner, the device further includes a calculation module, where the calculation module is configured to calculate a signal to interference plus noise ratio of the first cell in the second time interval in the first resource location according to the estimated inter-cell interference of the first cell in the second time interval.

With reference to the fifth possible implementation manner in the fourth aspect of the present invention, in a sixth possible implementation manner, the device further includes an adjustment module, where the adjustment module is configured to: determine, according to the calculated signal to interference plus noise ratio of the first cell in the second time interval, whether to schedule a user in the first resource location of the first cell; or determine, according to the calculated signal to interference plus noise ratio of the first cell, whether to adjust a modulation and coding scheme of a user scheduled in the first resource location of the first cell.

According to a fifth aspect of the present invention, a control apparatus is provided, where the control apparatus is applied to a first base station, the first base station manages a first cell, and the control apparatus includes:

a processor, a communications link, and a memory, where the processor communicates with the memory by using the communications link;

the memory stores an instruction or code, and when the instruction or code is run in the processor, the control apparatus is configured to control the first base station to execute the method described in the first aspect; or the control apparatus is configured to control the first base station to execute the method described in the second aspect.

According to a sixth aspect of the present invention, a base station is provided, where the base station manages a first cell, and the base station is configured to execute the method described in the first aspect; or the base station is configured to execute the method described in the second aspect.

According to a seventh aspect of the present invention, a computer program product is provided, where the computer program product includes computer program code, and when the computer program code is run by a processing unit, the processing unit executes the method described in the first aspect, or the processing unit executes the method described in the second aspect.

The present invention brings at least the following beneficial effects:

According to the embodiments of the present invention, a first base station may determine an interference level of inter-cell interference according to resource scheduling information of a neighboring cell of a cell managed by the first base station, and by using the interference level as an index, store real inter-cell interference that is obtained subsequently by means of measurement. That is, the first base station can establish and store a correlation between the interference level of the inter-cell interference and a real inter-cell interference value that is obtained subsequently by means of measurement. As time goes by, there may be multiple real inter-cell interference values correlated with an interference level. Predictably, based on the stored correlation between the interference level and the real inter-cell interference value obtained by means of measurement, the first base station can quickly and accurately predict a future inter-cell interference value by determining the interference level of the inter-cell interference, so as to relieve impact caused by fluctuation of the inter-cell interference on SINR estimation accuracy, lay a foundation for subsequent adjustment of a modulation and coding scheme of scheduled user equipment, and improve system performance effectively.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following further describes the embodiments of the present invention in detail with reference to this specification. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
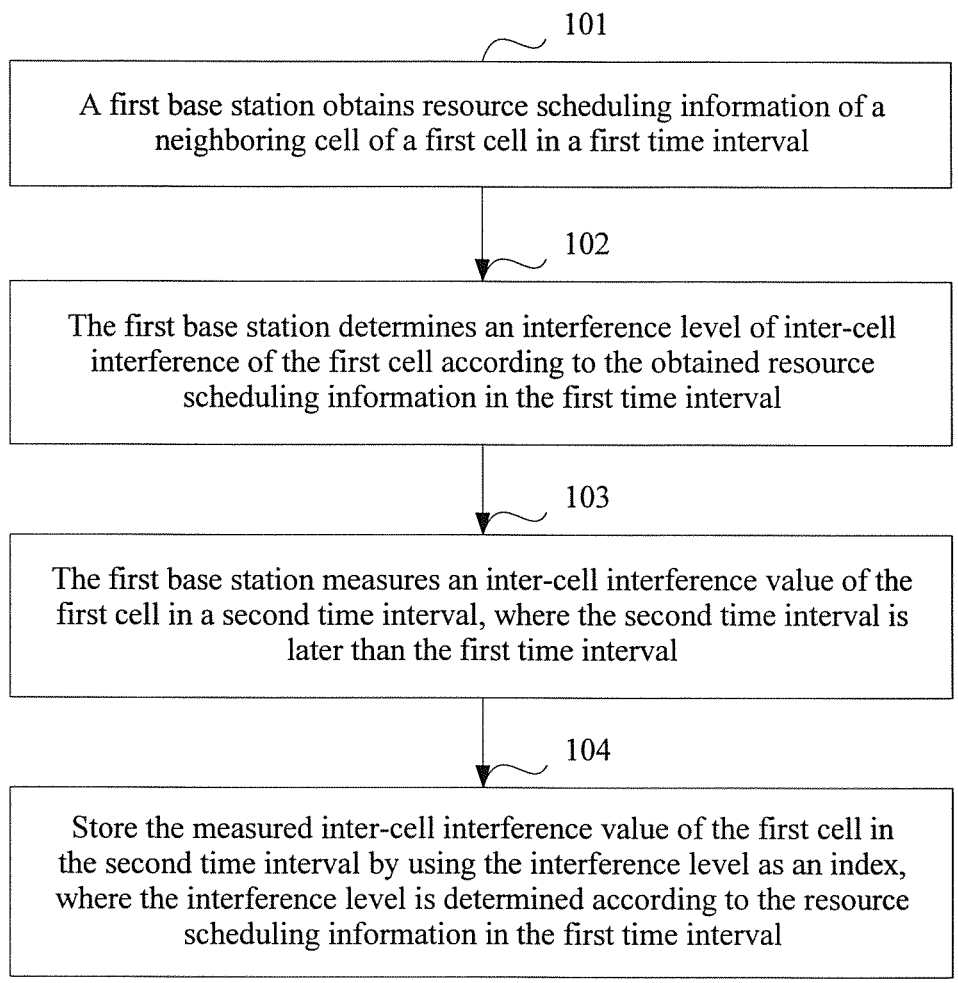
FIG. 1 is a schematic flowchart of a method for handling inter-cell interference according to Embodiment 1 of the present invention.

As shown in FIG. 1, FIG. 1 is a schematic flowchart of a method for handling inter-cell interference according to Embodiment 1 of the present invention. The method is applied to a first base station, the first base station manages a first cell, the method includes at least the following steps 101 to 104, and other optional steps or optional features described below may also be taken into account.

Step 101: The first base station obtains resource scheduling information of a neighboring cell of the first cell in a first time interval.

The resource scheduling information is used to represent a resource scheduling result of the neighboring cell in the first time interval.

It should be noted that the first base station may manage multiple cells, which means that some of the multiple cells managed by the first base station are neighboring cells of the first cell.

For example, in step 101, the obtaining, by the first base station, resource scheduling information of a neighboring cell of the first cell in a first time interval may include:

sending a request message to a second base station, where cells managed by the second base station include the neighboring cell of the first cell; and receiving the resource scheduling information of the neighboring cell of the first cell in the first time interval, where the resource scheduling information is sent by the second base station; or reading resource scheduling information of a second cell in the first time interval, where the first base station manages the second cell, and the second cell is the neighboring cell of the first cell.

In practical deployment, the first base station may determine, according to interference and noise (IN) of the first cell, whether to enable coordinated interference measurement or coordinated adaptive modulation and coding (AMC) between the first cell and multiple neighboring cells.

For example, the first base station may use a predefined enabling switch function to enable coordinated interference measurement or coordinated AMC between the first cell and the multiple neighboring cells. Enabling coordinated AMC means that the first base station obtains resource scheduling information of multiple neighboring cells of the first cell, and estimates inter-cell interference of the first cell according to the obtained resource scheduling information, so as to schedule a user in a resource location or adjust a modulation and coding scheme of a scheduled user in a resource location.

It should be noted that the first cell and multiple neighboring cells of the first cell may be managed by the same base station, or may be managed by different base stations.

Therefore, if the first cell and the multiple neighboring cells of the first cell are managed by the same base station, that is, the first base station, a manner in which the first base station reads the resource scheduling information of the second cell in the first time interval includes but is not limited to:

the first base station locally stores resource scheduling information of the multiple managed cells, and obtains the resource scheduling information of the neighboring cell (the second cell) of the first cell in the first time interval from a locally stored resource scheduling information list; or the first base station sends the resource scheduling information of the neighboring cell (the second cell) of the first cell in the first time interval to a core network, and requests the resource scheduling information of the neighboring cell of the first cell in the first time interval from the core network side.

If the first cell and the multiple neighboring cells of the first cell are managed by different base stations, that is, the first base station manages the first cell and a second base station manages at least one neighboring cell of the first cell, a manner in which the first base station obtains the resource scheduling information of the neighboring cell of the first cell includes but is not limited to:

sending a request message to the second base station that manages the neighboring cell, where the request message is used to request the second base station to send the resource scheduling information of the managed neighboring cell of the first cell in the first time interval; and receiving the resource scheduling information of the neighboring cell of the first cell in the first time interval, where the resource scheduling information is sent by the second base station.

It should be noted that a length of the first time interval may refer to a length of one transmission time interval (TTI); or may be a length of several TTIs; or may be another specified time length. The specific length of the first time interval is not limited herein.

Step 102: The first base station determines an interference level of inter-cell interference of the first cell according to the obtained resource scheduling information in the first time interval.

The resource scheduling information describes a resource scheduling result of a cell in a time interval. The resource scheduling result may include: a user is scheduled in a first resource location; or no user is scheduled in a first resource location.

Optionally, the resource scheduling result may further include: a user is scheduled in the first resource location, and the scheduled user is a strong-interference user.

The first resource location in the neighboring cell and the first resource location in the first cell denote a same resource location.

The strong-interference user is determined according to cell quality of the neighboring cell, cell quality of the first cell, and a threshold by a base station that manages the neighboring cell, where the cell quality of the neighboring cell is measured by user equipment.

For example, whether user equipment is a strong-interference user of the first cell is determined according to a difference between a reference signal received power (RSRP) of the first cell and an RSRP of the neighboring cell of the accessed first cell that are measured and reported by the user equipment. If the difference is less than a specified threshold, it is determined that the user equipment is a strong-interference user of the first cell; otherwise, it is determined that the user equipment is not a strong-interference user of the first cell.

In a communications system, the resource scheduling result is closely related to a resource granularity. For an interference level of inter-cell interference of a cell that is determined in this embodiment of the present invention, a factor of a resource granularity needs to be considered. Using an LTE system as an example, a resource granularity is generally a resource block (RB). In this case, the first resource location may refer to one RB or several RBs. Certainly, the first resource location may also refer to one subcarrier or several subcarriers; or may refer to one frequency band resource, or a spectrum resource, or the like. A specific meaning of the first resource location varies in different communications systems, and is not enumerated exhaustively herein.

In this embodiment of the present invention, multiple groups of interference levels may be maintained for one cell according to a system bandwidth of the cell and sizes of multiple resource locations including the first resource location. Assuming that the system bandwidth of the cell is 50 RBs, if a size of the first resource location and a size of another resource location are all 2 RBs, the cell may have at most 25 groups of interference levels of inter-cell interference. If the size of the first resource location and the size of the other resource location are all 1 RB, the cell may have at most 50 groups of interference levels of inter-cell interference. Each group of interference levels includes two or more interference levels.

Optionally, if the resource scheduling result of one or more neighboring cells in the first time interval includes: a user is scheduled in a first resource location, or no user is scheduled in a first resource location, where the first resource location in the neighboring cell and the first resource location in the first cell denote a same resource location, the determining an interference level of inter-cell interference of the first cell according to the obtained resource scheduling information in the first time interval may include:

determining the interference level of the inter-cell interference of the first cell according to a quantity of neighboring cells that have scheduled users in the first resource location; or determining the interference level of the inter-cell interference of the first cell according to a quantity of neighboring cells that have scheduled no user in the first resource location.

Resource scheduling information of a neighboring cell of a cell in a time interval reflects an expected data transmission status of the neighboring cell, and data transmission of the neighboring cell is a source of inter-cell interference for the cell. Generally, if a quantity of neighboring cells that schedule users in a same resource location is larger, the determined interference level of the inter-cell interference of the cell is higher; conversely, if the quantity of neighboring cells that schedule users in the resource location is smaller, the determined interference level of the inter-cell interference of the cell is lower.

In addition, because a time delay exists between scheduling and actual data transmission, the neighboring cell generally has not started data transmission when an interference level of inter-cell interference of a cell is being determined in this embodiment of the present invention. Therefore, the interference level is not real inter-cell interference, and the two are different concepts. The interference level is an inter-cell interference level that is predicted based on the resource scheduling information, and the real inter-cell interference may be obtained by the base station by means of measurement when the neighboring cell performs data transmission.

Optionally, interference levels may be classified into two types. One type means that intensity of inter-cell interference is ignorable, and the other type means that the intensity of inter-cell interference is not ignorable. The type, which means that the intensity of inter-cell interference is not ignorable, may further include multiple interference levels, and different interference levels represent different degrees of inter-cell interference intensity. For example, in the type which means that the intensity of inter-cell interference is not ignorable, two interference levels are further defined. One of the interference levels indicates higher inter-cell interference intensity, and the other indicates lower inter-cell interference intensity. Alternatively, three or more interference levels are further included. Obviously, in practical application, the quantity of interference levels of inter-cell interference and a meaning represented by each interference level may be adaptively adjusted according to a deployment scenario, and are not limited herein.

For example, the size of the first resource location is one RB, and is denoted by RB1. The quantity of interference levels of inter-cell interference may also be determined based on the quantity of neighboring cells that have scheduled users in the first resource location. For example:

If a scheduling result indicated by obtained resource scheduling information of N neighboring cells in the first time interval is that N neighboring cells have scheduled users on the RB1, it is determined that the interference level of inter-cell interference of the first cell is that N neighboring cells generate inter-cell interference on the RB1, where a value range of N is 1 to a quantity of received resource scheduling information.

If a scheduling result indicated by obtained resource scheduling information of N neighboring cells in the first time interval is that P neighboring cells have scheduled users on the RB1, it is determined that the interference level of inter-cell interference of the first cell is that P neighboring cells generate inter-cell interference on the RB1, where a value range of P is 1 to N.

If a scheduling result indicated by obtained resource scheduling information of N neighboring cells in the first time interval is that one neighboring cell has scheduled a user on the RB1, it is determined that the interference level of inter-cell interference of the first cell is that one neighboring cell generates inter-cell interference on the RB1.

If a scheduling result indicated by obtained resource scheduling information of N neighboring cells in the first time interval is that 0 neighboring cell has scheduled a user on the RB1, it is determined that the interference level of inter-cell interference of the first cell is that no neighboring cell generates inter-cell interference on the RB1.

Specifically, Table 1 shows how to determine an interference level of inter-cell interference of the first cell according to the resource scheduling information of the neighboring cell in the first time interval:

TABLE 1

| Resource location | Interference level determined according to resource scheduling information (first time interval) |
| --- | --- |
| RB1 | Zero neighboring cell has scheduled a user |
|  | One neighboring cell has scheduled a user |
|  | Two neighboring cells have scheduled users |
|  | Three neighboring cells have scheduled users |
|  | . . . |
|  | N neighboring cells have scheduled users |

It can be learned from Table 1 that for the resource block RB1, the interference level of inter-cell interference of the first cell is determined according to the resource scheduling information of the neighboring cell in the first time interval:

1. Zero neighboring cell has scheduled a user, and other N neighboring cells have scheduled no user;

2. One neighboring cell has scheduled a user, and other N−1 neighboring cells have scheduled no user;

3. Two neighboring cells have scheduled users, and other N−2 neighboring cells have scheduled no user;

4. Three neighboring cells have scheduled users, and other N−3 neighboring cells have scheduled no user;

. . .

N+1. N neighboring cells have scheduled users, where N is a natural number.

It should be noted that the N neighboring cells mentioned in the interference level may be any N neighboring cells of neighboring cells of the first cell, and no specific neighboring cells are specified.

For another example, that one neighboring cell has scheduled a user may be: any neighboring cell of the first cell has scheduled a user; or, the interference level equivalent to that one neighboring cell has scheduled a user may be specifically: a neighboring cell L1 has scheduled a user, or a neighboring cell L2 has scheduled a user, or a neighboring cell L3 has scheduled a user, or . . . , or a neighboring cell Lm has scheduled a user, or . . . , or a neighboring cell Ln has scheduled a user, where L1-Lm-Ln are identifiers of the neighboring cells.

That two neighboring cells have scheduled users may be: any two neighboring cells of the first cell have scheduled users; or, the interference level equivalent to that two neighboring cells have scheduled users may be specifically: a neighboring cell L1 has scheduled a user and a neighboring cell L2 has scheduled a user, or a neighboring cell L3 has scheduled a user and a neighboring cell L4 has scheduled a user, or a neighboring cell L5 has scheduled a user and a neighboring cell L6 has scheduled a user, or . . . , or a neighboring cell Lm has scheduled a user and a neighboring cell Lp has scheduled a user, or . . . , or a neighboring cell Ln has scheduled a user and a neighboring cell Lt has scheduled a user, where L1-Lm-Lp-Ln-Lt are identifiers of the neighboring cells.

Optionally, it is assumed that the first base station obtains the resource scheduling information of the N neighboring cells in the first time interval, each piece of resource scheduling information includes resource location information and a scheduled user, and the scheduled user is a strong-interference user. The determining the interference level of the inter-cell interference of the first cell according to a quantity of neighboring cells that have scheduled users in the first resource location includes:

determining the interference level of the inter-cell interference of the first cell according to a quantity of neighboring cells that have scheduled strong-interference users in the first resource location.

Specifically, the interference level of inter-cell interference of the first cell may also be determined according to whether a user scheduled in a resource location is a strong-interference user and a quantity of neighboring cells that have scheduled strong-interference users in the resource location.

For example, for a resource location (for example, RB1), if a scheduling result indicated by obtained resource scheduling information of N neighboring cells in the first time interval is that N neighboring cells have scheduled users on RB1, and M neighboring cells of the N neighboring cells have scheduled strong-interference users, it is determined that the interference level of inter-cell interference of the first cell is that M neighboring cells have scheduled strong-interference users on the RB1 and generate inter-cell high interference, where a value range of N is 1 to a quantity of received resource scheduling information, and a value range of M is 1 to M.

If a scheduling result indicated by obtained resource scheduling information of N neighboring cells in the first time interval is that N neighboring cells have scheduled users on the RB1, and one neighboring cell of the N neighboring cells has scheduled a strong-interference user, it is determined that the interference level of inter-cell interference of the first cell is that one neighboring cell has scheduled a strong-interference user on the RB1 and generates inter-cell high interference.

If a scheduling result indicated by obtained resource scheduling information of N neighboring cells in the first time interval is that N neighboring cells have scheduled users on the RB1, and none of the N neighboring cells has scheduled a strong-interference user, it is determined that the interference level of inter-cell interference of the first cell is that no neighboring cell has scheduled a strong-interference user on the RB1 and generates inter-cell high interference.

Specifically, Table 2 shows how to determine an interference level of inter-cell interference of the first cell according to the resource scheduling information of the neighboring cell in the first time interval:

TABLE 2

| Resource location | Interference level determined according to resource scheduling information (first time interval) |
| --- | --- |
| RB1 | Zero neighboring cell has scheduled a strong-interference user |
| | One neighboring cell has scheduled a strong-interference user |
| | Two neighboring cells have scheduled strong-interference users |

TABLE 2-continued

| Resource location | Interference level determined according to resource scheduling information (first time interval) |
| --- | --- |
| | Three neighboring cells have scheduled strong-interference users |
| | . . . |
| | N neighboring cells have scheduled strong-interference users |

It can be learned from Table 2 that for the resource block RB1, the interference level of inter-cell interference of the first cell is determined according to the resource scheduling information of the neighboring cell in the first time interval:

1. Zero neighboring cell has scheduled a strong-interference user;
2. One neighboring cell has scheduled a strong-interference user;
3. Two neighboring cells have scheduled strong-interference users;
4. Three neighboring cells have scheduled strong-interference users;
. . .
N+1. N neighboring cells have scheduled strong-interference users, where N is a natural number.

It should be noted that the N neighboring cells mentioned in the interference level may be any N neighboring cells of neighboring cells of the first cell, and no specific neighboring cells are specified.

For another example, that one neighboring cell has scheduled a strong-interference user may be: any neighboring cell of the first cell has scheduled a strong-interference user; or the interference level equivalent to that one neighboring cell has scheduled a strong-interference user may be specifically: a neighboring cell L1 has scheduled a strong-interference user, or a neighboring cell L2 has scheduled a strong-interference user, or a neighboring cell L3 has scheduled a strong-interference user, or . . . , or a neighboring cell Lm has scheduled a strong-interference user, or . . . , or a neighboring cell Ln has scheduled a strong-interference user, where L1-Lm-Ln are identifiers of the neighboring cells.

That two neighboring cells have scheduled strong-interference users may be: any two neighboring cells of the first cell have scheduled strong-interference users; or, the interference level equivalent to that two neighboring cells have scheduled strong-interference users may be specifically: a neighboring cell L1 has scheduled a strong-interference user and a neighboring cell L2 has scheduled a strong-interference user, or a neighboring cell L3 has scheduled a strong-interference user and a neighboring cell L4 has scheduled a strong-interference user, or a neighboring cell L5 has scheduled a strong-interference user and a neighboring cell L6 has scheduled a strong-interference user, or . . . , or a neighboring cell Lm has scheduled a strong-interference user and a neighboring cell Lp has scheduled a strong-interference user, or . . . , or a neighboring cell Ln has scheduled a strong-interference user and a neighboring cell Lt has scheduled a strong-interference user, where N and L1-Lm-Lp-Ln-Lt are identifiers of the neighboring cells.

For another example, assuming that the first cell has six resource blocks in total, which are denoted by RB1-RB6, six groups of interference levels of inter-cell interference of the first cell are maintained according to the resource scheduling information of the neighboring cell in the first time interval, and each group of interference levels may include two or more interference levels mentioned above. Definitions of interference levels in different groups of interference levels may be independent of each other, that is, may be the same or may be different from each other, as shown in Table 3:

TABLE 3

| Resource location | Interference level (first time interval) |
|---|---|
| RB1 | Two or more interference levels |
| RB2 | Two or more interference levels |
| RB3 | . . . |
| RB4 | . . . |
| RB5 | . . . |
| RB6 | Two or more interference levels |

Step 103: The first base station measures an inter-cell interference value of the first cell in a second time interval, where the second time interval is later than the first time interval.

As mentioned above, resource scheduling information of a neighboring cell of a cell in a time interval reflects an expected data transmission status of the neighboring cell, and a time delay exists between scheduling and actual data transmission. For the resource scheduling information, obtained in step 101, of the neighboring cell of the first cell in the first time interval, the neighboring cell performs actual data transmission only in the second time interval, and generates inter-cell interference to the first cell at the same time. The second time interval is a time interval in which data is actually transmitted by the neighboring cell of the first cell based on the resource scheduling information in the first time interval. Therefore, although the inter-cell interference level of the first cell may be determined in step 102, real inter-cell interference needs to be obtained by the first base station by measuring in the second time interval.

When obtaining the resource scheduling information in the first time interval, the first base station may determine, according to a timing relationship between scheduling and data transmission, the second time interval for measuring inter-cell interference, where the timing relationship is stipulated in a system in advance. Alternatively, the second time interval may be determined by exchanging messages between the first base station and the second base station. A specific manner of determining the second time interval is not limited herein.

Step 104: Store the measured inter-cell interference value of the first cell in the second time interval by using the interference level as an index, where the interference level is determined according to the resource scheduling information in the first time interval.

In the foregoing step, after obtaining the resource scheduling information in the first time interval, the first base station may determine the interference level of inter-cell interference of the first cell and determine the second time interval for measuring the inter-cell interference. Therefore, after the inter-cell interference value of the first cell is obtained by means of measurement in the second time interval, the measured inter-cell interference value of the first cell in the second time interval may be stored by using the interference level as an index, where the interference level is determined according to the resource scheduling information in the first time interval. That is, a correlation between the interference level determined according to the resource scheduling information in the first time interval and the inter-cell interference value of the first cell obtained by means of measurement in the second time interval may be established and stored in step 104.

The correlation may be stored in the first base station in a form of a table or a database, or may be stored in the first base station in another form.

For example, as shown in Table 4, the correlation between the interference level determined according to the resource scheduling information in the first time interval and the inter-cell interference value of the first cell obtained by means of measurement in the second time interval is schematically expressed in a tabular form. The first column in Table 4 denotes different resource locations in the first cell, and the second column denotes a group of interference levels maintained for the resource location. For a purpose of illustration, a quantity of interference levels determined according to the resource scheduling information and definitions of the interference levels are independent for different resource locations. In another possible case, the quantity of interference levels and the definitions of the interference levels may be the same for different resource locations. The third column denotes inter-cell interference values that are correlated with the interference levels in the second column and are actually obtained by the base station by means of measurement. Table 4 is merely for illustration purposes, and is not intended to limit this embodiment of the present invention.

TABLE 4

| Resource location | Interference level determined according to resource scheduling information (first time interval) | Inter-cell interference value obtained by means of measurement (second time interval) |
|---|---|---|
| First resource location | First interference level (which means that interference intensity is ignorable) | $X_{11}$ |
| | Second interference level (which means that interference intensity is not ignorable) | $X_{12}$ |
| Second resource location | First interference level (which means that interference intensity is ignorable) | $X_{21}$ |
| | Third interference level (which means that interference intensity is not ignorable and the interference intensity is low) | $X_{22}$ |
| | Fourth interference level (which means that interference intensity is not ignorable and the interference intensity is high) | $X_{23}$ |
| . . . | . . . | . . . |
| $N^{th}$ resource location | First interference level (which means scheduling in no neighboring cell) | $X_{n1}$ |
| | Fifth interference level (which means scheduling in one neighboring cell) | $X_{n2}$ |
| | Sixth interference level (which means scheduling in two neighboring cells) | $X_{n3}$ |
| | Seventh interference level (which means scheduling in at least three neighboring cells) | $X_{n4}$ |

Optionally, the method may further include:

obtaining resource scheduling information of the neighboring cell of the first cell in a third time interval, where the resource scheduling information is used to represent a resource scheduling result of the neighboring cell in the third time interval;

determining an interference level of inter-cell interference of the first cell according to the obtained resource scheduling information in the third time interval;

measuring an inter-cell interference value of the first cell in a fourth time interval, where the fourth time interval is later than the third time interval; and storing the measured inter-cell interference value of the first cell in the fourth time interval by using the interference level as an index, where the interference level is determined according to the resource scheduling information in the third time interval.

Optionally, when the measured inter-cell interference value of the first cell in the fourth time interval is being stored, if the interference level determined according to the resource scheduling information in the third time interval is the same as the interference level determined according to the resource scheduling information in the first time interval, a statistic value of the inter-cell interference values of the first cell is calculated and stored according to the measured inter-cell interference value of the first cell in the second time interval and the measured inter-cell interference value of the first cell in the fourth time interval; or the measured inter-cell interference value of the first cell in the second time interval is deleted, where the fourth time interval is later than the second time interval.

For example, the interference level determined according to the resource scheduling information in the first time interval is: one neighboring cell has scheduled a user and other N−1 neighboring cells have scheduled no user, and a measured interference value obtained in the second time interval is R1; the interference level determined according to the resource scheduling information in the third time interval is: one neighboring cell has scheduled a user and other N−1 neighboring cells have scheduled no user, and a measured interference value obtained in the second time interval is R3. In this case, for the interference level "one neighboring cell has scheduled a user and other N−1 neighboring cells have scheduled no user", the determined inter-cell interference value of the first cell may be an average value of R1 and R3, or may be a weighted average value of R1 and R3, where a time factor may be considered in determining weights of R1 and R3; or R3 may simply replace R1. This is not specifically limited herein.

It should be noted that the statistic value mentioned herein may be an average value of multiple inter-cell interference values corresponding to the same interference level, or may refer to a weighted value of multiple inter-cell interference values corresponding to the same interference level, or a statistic value obtained by another statistical method. A specific manner of obtaining the statistic value is not limited herein, and may be determined according to requirements.

In addition, if the determined interference level is that M neighboring cells in the obtained N pieces of resource scheduling information have scheduled strong-interference users in the first resource location, another manner of obtaining the inter-cell interference value corresponding to the determined interference level is provided below:

First, an interference value (herein referred to as a first interference value) obtained by means of measurement when N neighboring cells have scheduled no user in the first resource location is determined according to stored and historically measured inter-cell interference value of the first cell.

Second, a channel at a receiving time point is predicted according to sounding reference signals (English: Sounding Reference Signal; SRS for short) and demodulation signals of the M neighboring cells that have scheduled strong-interference users, and an interference value (herein referred to as a second interference value) of interference caused by the scheduled strong-interference users to the first cell at the receiving time point is predicted according to the predicted channel at the receiving time point.

Alternatively, interference on the channel on which SRS signals and demodulation signals of the scheduled strong-interference users are located is measured at the receiving time point according to the SRS signals and the demodulation signals, so as to obtain an interference value (herein referred to as a second interference value) of interference caused by the scheduled strong-interference users to the first cell at the receiving time point.

Finally, the first interference value and the second interference value are added together to obtain the inter-cell interference value corresponding to the determined interference level.

According to the solution provided in Embodiment 1 of the present invention, a base station may determine an interference level of inter-cell interference according to resource scheduling information of a neighboring cell of a cell managed by the base station, and by using the interference level as an index, store real inter-cell interference that is obtained subsequently by means of measurement. That is, the base station can establish and store a correlation between the interference level of the inter-cell interference and a real inter-cell interference value that is obtained subsequently by means of measurement. As time goes by, there may be multiple real inter-cell interference values correlated with an interference level; and when the foregoing optional step is performed, a statistic value of more accurate inter-cell interference values correlated with the interference level can be obtained, or a latest inter-cell interference value is always reserved. Predictably, based on the stored correlation between the interference level and the real inter-cell interference value obtained by means of measurement, the base station can quickly and accurately predict a future inter-cell interference value by determining the interference level of the inter-cell interference, so as to relieve impact caused by fluctuation of the inter-cell interference on SINR estimation accuracy.

Embodiment 2

Figure 2:
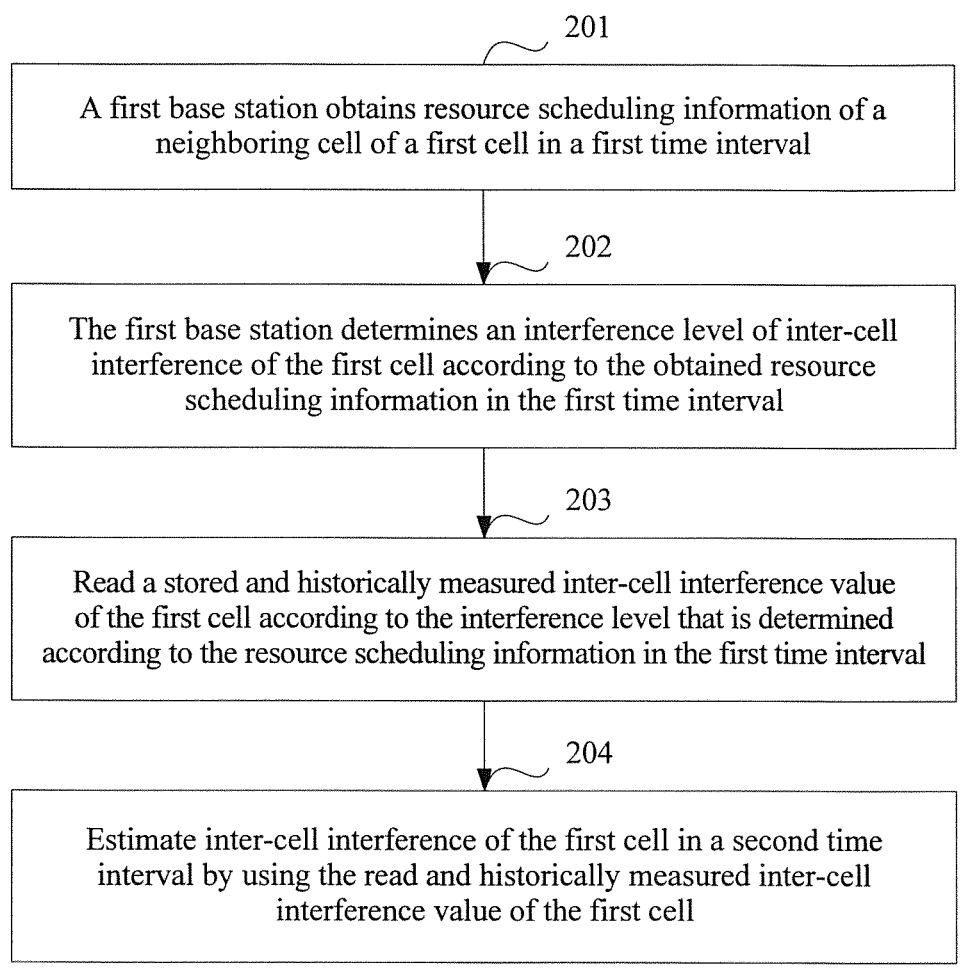
FIG. 2 is a schematic flowchart of a method for handling inter-cell interference according to Embodiment 2 of the present invention.

As shown in FIG. 2, FIG. 2 is a schematic flowchart of a method for handling inter-cell interference according to Embodiment 2 of the present invention. A stored and historically measured inter-cell interference value, involved in Embodiment 2 of the present invention, of a first cell may be implemented according to the technical solution described in Embodiment 1 of the present invention. The method may be described as follows.

Step 201: A first base station obtains resource scheduling information of a neighboring cell of a first cell in a first time interval.

The resource scheduling information is used to represent a resource scheduling result of the neighboring cell in the first time interval.

In step 201, the obtaining resource scheduling information of a neighboring cell of a first cell in a first time interval includes:

sending a request message to a second base station, where cells managed by the second base station include the neighboring cell of the first cell; and receiving the resource scheduling information of the neighboring cell of the first cell in the first time interval, where the resource scheduling information is sent by the second base station; or reading resource scheduling information of a second cell, where the first base station manages the second cell, and the second cell is the neighboring cell of the first cell.

It should be noted that the manner of obtaining the resource scheduling information in step 201 is the same as the manner of obtaining the resource scheduling information in step 101 in Embodiment 1 of the present invention, and is not repeated herein any further.

Step 202: The first base station determines an interference level of inter-cell interference of the first cell according to the obtained resource scheduling information in the first time interval.

The resource scheduling information describes a resource scheduling result of a cell in a time interval. The resource scheduling result may include: a user is scheduled in a first resource location; or no user is scheduled in a first resource location.

Optionally, the resource scheduling result may further include: a user is scheduled in the first resource location, and the scheduled user is a strong-interference user.

The first resource location in the neighboring cell and the first resource location in the first cell denote a same resource location.

The strong-interference user is determined according to cell quality of the neighboring cell, cell quality of the first cell, and a threshold by a base station that manages the neighboring cell, where the cell quality of the neighboring cell is measured by user equipment.

For example, whether user equipment is a strong-interference user of the first cell is determined according to a difference between an RSRP (English: Reference Signal Received Power; Chinese: Reference Signal Received Power) of the first cell and an RSRP of the neighboring cell of the accessed first cell that are measured and reported by the user equipment. If the difference is less than a specified threshold, it is determined that the user equipment is a strong-interference user of the first cell; otherwise, it is determined that the user equipment is not a strong-interference user of the first cell.

In a communications system, the resource scheduling result is closely related to a resource granularity. For an interference level of inter-cell interference of a cell that is determined in this embodiment of the present invention, a factor of a resource granularity needs to be considered. Using an LTE system as an example, a resource granularity is generally a resource block (English: Recourse Block; RB for short). In this case, the first resource location may refer to one resource block (English: Recourse Block; RB for short) or several resource blocks. Certainly, the first resource location may also refer to one subcarrier or several subcarriers; or may refer to one frequency band resource, or a spectrum resource, or the like. A specific meaning of the first resource location varies in different communications systems, and is not enumerated exhaustively herein.

In this embodiment of the present invention, multiple groups of interference levels may be maintained for one cell according to a system bandwidth of the cell and sizes of multiple resource locations including the first resource location. Assuming that the system bandwidth of the cell is 50 RBs, if a size of the first resource location and a size of another resource location are all 2 RBs, the cell may have at most 25 groups of interference levels of inter-cell interference. If the size of the first resource location and the size of the other resource location are all 1 RB, the cell may have at most 50 groups of interference levels of inter-cell interference. Each group of interference levels includes two or more interference levels.

Optionally, if the resource scheduling result of one or more neighboring cells in the first time interval includes: a user is scheduled in a first resource location, or no user is scheduled in a first resource location, where the first resource location in the neighboring cell and the first resource location in the first cell denote a same resource location, the determining an interference level of inter-cell interference of the first cell according to the obtained resource scheduling information in the first time interval may include:

determining the interference level of the inter-cell interference of the first cell according to a quantity of neighboring cells that have scheduled users in the first resource location; or determining the interference level of the inter-cell interference of the first cell according to a quantity of neighboring cells that have scheduled no user in the first resource location.

Resource scheduling information of a neighboring cell of a cell in a time interval reflects an expected data transmission status of the neighboring cell, and data transmission of the neighboring cell is a source of inter-cell interference for the cell. Generally, if a quantity of neighboring cells that schedule users in a same resource location is larger, the determined interference level of the inter-cell interference of the cell is higher; conversely, if the quantity of neighboring cells that schedule users in the resource location is smaller, the determined interference level of the inter-cell interference of the cell is lower.

In addition, because a time delay exists between scheduling and actual data transmission, the neighboring cell generally has not started data transmission when an interference level of inter-cell interference of a cell is being determined in this embodiment of the present invention. Therefore, the interference level is not real inter-cell interference, and the two are different concepts. The interference level is an inter-cell interference level that is predicted based on the resource scheduling information, and the real inter-cell interference may be obtained by the base station by means of measurement when the neighboring cell performs data transmission.

Optionally, interference levels may be classified into two types. One type means that intensity of inter-cell interference is ignorable, and the other type means that intensity of inter-cell interference is not ignorable. The type, which means that the intensity of inter-cell interference is not ignorable, may further include multiple interference levels, and different interference levels represent different degrees of inter-cell interference intensity. For example, in the type which means that the intensity of inter-cell interference is not ignorable, two interference levels are further defined. One of the interference levels indicates higher inter-cell interference intensity, and the other indicates lower inter-cell interference intensity. Alternatively, three or more interference levels are further included. Obviously, in practical application, the quantity of interference levels of inter-cell interference and a meaning represented by each interference level may be adaptively adjusted according to a deployment scenario, and are not limited herein.

It should be noted that the manner of determining the interference level in step 202 is the same as the manner of determining the interference level in step 102 in Embodiment 1 of the present invention, and is not repeated herein any further.

Step 203: Read a stored and historically measured inter-cell interference value of the first cell according to the interference level that is determined according to the resource scheduling information in the first time interval.

In step 203, the stored and historically measured inter-cell interference value of the first cell includes:

an inter-cell interference value of the first cell that is measured by the first base station in one or more historical time intervals, where the inter-cell interference value is pre-stored in the first base station by using an interference level as an index, the interference level is the same as the interference level determined according to the resource scheduling information in the first time interval, and the one or more historical time intervals are all earlier than the second time interval; or a statistic value, calculated and stored by the first base station according to inter-cell interference values of the first cell that are measured in multiple historical time intervals, of inter-cell interference values of the first cell, where the statistic value of the inter-cell interference values of the first cell is pre-stored in the first base station by using an interference level as an index, the interference level is the same as the interference level determined according to the resource scheduling information in the first time interval, and the multiple historical time intervals are all earlier than the second time interval.

It should be noted that the stored and historically measured inter-cell interference value of the first cell may be implemented in the manner described in step 101 to step 104 in Embodiment 1 of the present invention, and is not described herein any further.

Step 204: Estimate inter-cell interference of the first cell in a second time interval by using the read and historically measured inter-cell interference value of the first cell.

The second time interval is later than the first time interval.

Optionally, the method further includes:

estimating inter-cell interference of the first cell in a second time interval by using the read and historically measured inter-cell interference value of the first cell, and calculating a signal to interference plus noise ratio of the first cell in the second time interval in the first resource location according to the estimated inter-cell interference of the first cell in the second time interval.

Optionally, the method further includes:

determining, according to the calculated signal to interference plus noise ratio of the first cell in the second time interval, whether to schedule a user in the first resource location of the first cell; or determining, according to the calculated signal to interference plus noise ratio of the first cell, whether to adjust a modulation and coding scheme of a user scheduled in the first resource location of the first cell.

According to the solution in Embodiment 2 of the present invention, the first base station manages a first cell, and obtains resource scheduling information of a neighboring cell of the first cell in a first time interval, where the resource scheduling information is used to represent a resource scheduling result of the neighboring cell in the first time interval; determines an interference level of inter-cell interference of the first cell according to the obtained resource scheduling information in the first time interval; reads a stored and historically measured inter-cell interference value of the first cell according to the interference level that is determined according to the resource scheduling information in the first time interval; and estimates inter-cell interference of the first cell in a second time interval by using the read and historically measured inter-cell interference value of the first cell. The stored and historically measured inter-cell interference value of the first cell is real inter-cell interference obtained by means of measurement, and the base station reads the historically measured inter-cell interference value of the first cell by determining the interference level of the inter-cell interference. In this way, a future inter-cell interference value can be quickly and accurately predicted by using the read and historically measured inter-cell interference value of the first cell, thereby laying a foundation for subsequent adjustment of a modulation and coding scheme of scheduled user equipment and improving system performance effectively.

Embodiment 3

Figure 3:
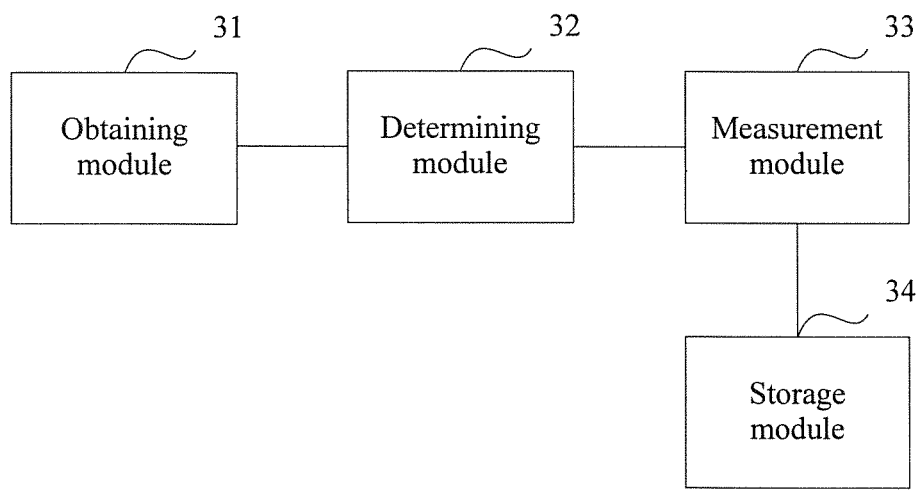
FIG. 3 is a schematic structural diagram of a device for handling inter-cell interference according to Embodiment 3 of the present invention.

As shown in FIG. 3, FIG. 3 is a schematic structural diagram of a device for handling inter-cell interference according to Embodiment 3 of the present invention. The device may be applied to a first base station, the first base station manages a first cell, and the device includes: an obtaining module 31, a determining module 32, a measurement module 33, and a storage module 34.

The obtaining module 31 is configured to obtain resource scheduling information of a neighboring cell of the first cell in a first time interval, where the resource scheduling information is used to represent a resource scheduling result of the neighboring cell in the first time interval.

The determining module 32 is configured to determine an interference level of inter-cell interference of the first cell according to the obtained resource scheduling information in the first time interval.

The measurement module 33 is configured to measure an inter-cell interference value of the first cell in a second time interval, where the second time interval is later than the first time interval.

The storage module 34 is configured to store the measured inter-cell interference value of the first cell in the second time interval by using the interference level as an index, where the interference level is determined according to the resource scheduling information in the first time interval.

Specifically, the obtaining module 31 is specifically configured to send a request message to a second base station, where cells managed by the second base station include the neighboring cell of the first cell; and receive the resource scheduling information of the neighboring cell of the first cell in the first time interval, where the resource scheduling information is sent by the second base station; or read resource scheduling information of a second cell in the first time interval, where the first base station manages the second cell, and the second cell is the neighboring cell of the first cell.

Specifically, the resource scheduling result of the neighboring cell in the first time interval includes: a user is scheduled in a first resource location, or no user is scheduled in a first resource location, where the first resource location in the neighboring cell and the first resource location in the first cell denote a same resource location; and the determining module 32 is specifically configured to determine the interference level of the inter-cell interference of the first cell according to a quantity of neighboring cells that have scheduled users in the first resource location; or determine the interference level of the inter-cell interference of the first cell according to a quantity of neighboring cells that have scheduled no user in the first resource location.

Specifically, when the resource scheduling result of the neighboring cell in the first time interval is: a user is scheduled in the first resource location, and the scheduled user is a strong-interference user, the determining module 32 is specifically configured to determine the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

Specifically, the obtaining module 31 is further configured to obtain resource scheduling information of the neighboring cell of the first cell in a third time interval, where the resource scheduling information is used to represent a resource scheduling result of the neighboring cell in the third time interval.

The determining module 32 is further configured to determine an interference level of inter-cell interference of the first cell according to the obtained resource scheduling information in the third time interval.

The measurement module 33 is further configured to measure an inter-cell interference value of the first cell in a fourth time interval, where the fourth time interval is later than the third time interval.

The storage module 34 is further configured to store the measured inter-cell interference value of the first cell in the fourth time interval by using the interference level as an index, where the interference level is determined according to the resource scheduling information in the third time interval.

Specifically, the storage module 34 is further configured to: when the interference level determined according to the resource scheduling information in the first time interval is the same as the interference level determined according to the resource scheduling information in the third time interval, calculate and store a statistic value of the inter-cell interference values of the first cell according to the measured inter-cell interference value of the first cell in the second time interval and the measured inter-cell interference value of the first cell in the fourth time interval; or delete the measured inter-cell interference value of the first cell in the second time interval, where the fourth time interval is later than the second time interval.

It should be noted that the device provided in Embodiment 3 of the present invention may be implemented in a hardware manner or in a software manner, and the implementation manner is not limited herein.

Embodiment 4

Figure 4:
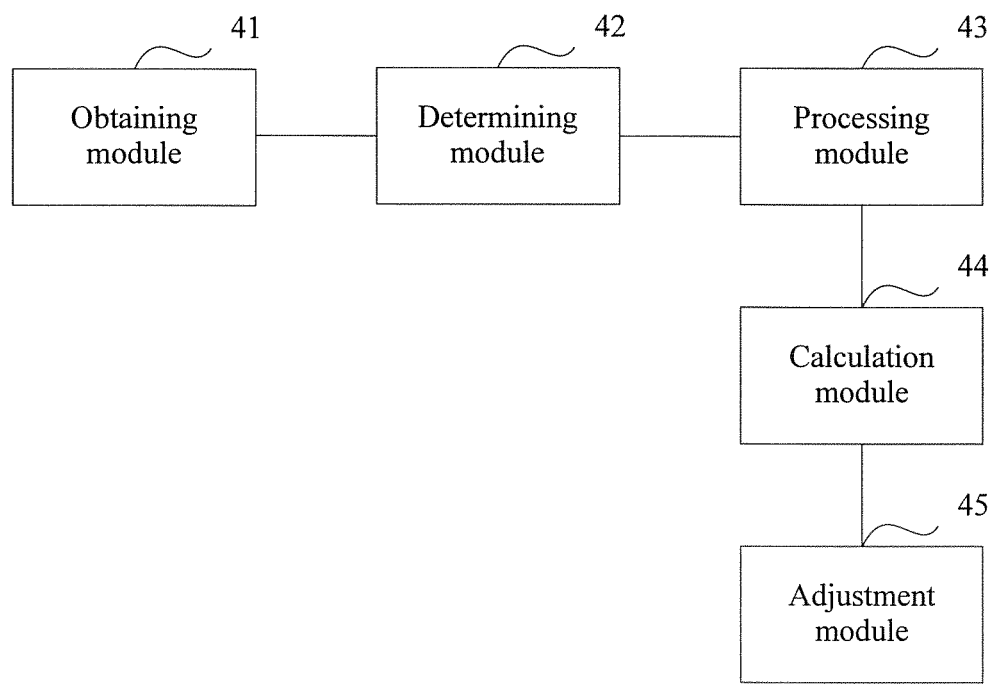
FIG. 4 is a schematic structural diagram of a device for handling inter-cell interference according to Embodiment 4 of the present invention.

As shown in FIG. 4, FIG. 4 is a schematic structural diagram of a device for handling inter-cell interference according to Embodiment 4 of the present invention. The device may be applied to a first base station, the first base station manages a first cell, and the device includes: an obtaining module 41, a determining module 42, and a processing module 43.

The obtaining module 41 is configured to obtain resource scheduling information of a neighboring cell of the first cell in a first time interval, where the resource scheduling information is used to represent a resource scheduling result of the neighboring cell in the first time interval.

The determining module 42 is configured to determine an interference level of inter-cell interference of the first cell according to the obtained resource scheduling information in the first time interval.

The processing module 43 is configured to: read a stored and historically measured inter-cell interference value of the first cell according to the interference level that is determined according to the resource scheduling information in the first time interval; and estimate inter-cell interference of the first cell in a second time interval by using the read and historically measured inter-cell interference value of the first cell, where the second time interval is later than the first time interval.

Optionally, the stored and historically measured inter-cell interference value of the first cell includes:

an inter-cell interference value of the first cell that is measured in one or more historical time intervals, where the inter-cell interference value is pre-stored in the device by using an interference level as an index, the interference level is the same as the interference level determined according to the resource scheduling information in the first time interval, and the one or more historical time intervals are all earlier than the second time interval; or a statistic value, calculated and stored according to inter-cell interference values of the first cell that are measured in multiple historical time intervals, of inter-cell interference values of the first cell, where the statistic value of the inter-cell interference values of the first cell is pre-stored in the device by using an interference level as an index, the interference level is the same as the interference level determined according to the resource scheduling information in the first time interval, and the multiple historical time intervals are all earlier than the second time interval.

Specifically, the obtaining module 41 is specifically configured to send a request message to a second base station, where cells managed by the second base station include the neighboring cell of the first cell; and receive the resource scheduling information of the neighboring cell of the first cell in the first time interval, where the resource scheduling information is sent by the second base station; or read resource scheduling information of a second cell, where the first base station manages the second cell, and the second cell is the neighboring cell of the first cell.

Specifically, the resource scheduling result of the neighboring cell in the first time interval includes: a user is scheduled in a first resource location, or no user is scheduled in a first resource location, where the first resource location in the neighboring cell and the first resource location in the first cell denote a same resource location; and the determining module 42 is specifically configured to determine the interference level of the inter-cell interference of the first cell according to a quantity of neighboring cells that have scheduled users in the first resource location; or determine the interference level of the inter-cell interference of the first cell according to a quantity of neighboring cells that have scheduled no user in the first resource location.

Specifically, when the resource scheduling result of the neighboring cell in the first time interval is: a user is scheduled in the first resource location, and the scheduled user is a strong-interference user, the determining module 42 is specifically configured to determine the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

Optionally, the device further includes a calculation module 44.

The calculation module 44 is configured to calculate a signal to interference plus noise ratio of the first cell in the second time interval in the first resource location according to the estimated inter-cell interference of the first cell in the second time interval.

Optionally, the device further includes an adjustment module 45.

The adjustment module 45 is configured to: determine, according to the calculated signal to interference plus noise ratio of the first cell in the second time interval, whether to schedule a user in the first resource location of the first cell; or determine, according to the calculated signal to interference plus noise ratio of the first cell, whether to adjust a modulation and coding scheme of a user scheduled in the first resource location of the first cell.

It should be noted that the device provided in Embodiment 4 of the present invention may be implemented in a hardware manner or in a software manner, and the implementation manner is not limited herein.

Embodiment 5

Figure 5:
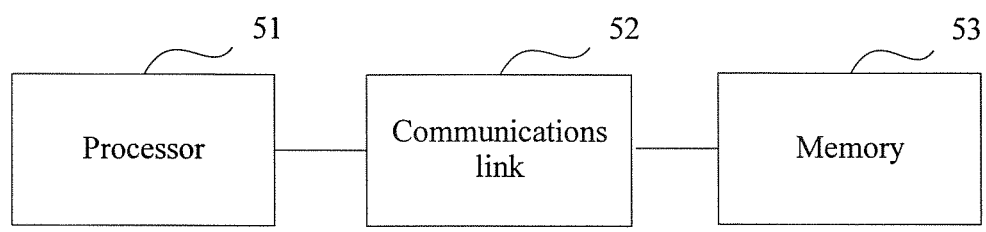
FIG. 5 is a schematic structural diagram of a control apparatus according to Embodiment 5 of the present invention.

As shown in FIG. 5, FIG. 5 is a schematic structural diagram of a control apparatus according to Embodiment 5 of the present invention. The control apparatus provided in Embodiment 5 of the present invention has functions of Embodiment 1 to Embodiment 4 of the present invention. The control apparatus is applied to a first base station, the first base station manages a first cell, and the control apparatus includes: a processor 51, a communications link 52, and a memory 53. The processor 51 communicates with the memory 53 by using the communications link 52.

The processor 51 may be a general-purpose central processing unit (CPU), a microprocessor, an application-specific integrated circuit (application-specific integrated circuit, ASIC), or one or more integrated circuits used to control execution of a program of the solution in the present invention.

The memory 53 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM), or other disc storage media, optical disc storage media (including compact disc, laser disc, optical disc, digital versatile disk, and Blu-ray disc), magnetic disc storage media or other magnetic storage devices, or any other media that can be used to carry or store expected program code in an instruction form or a data structure form and can be accessed by a computer, but without being limited thereto. The memories are connected to the processor by means of a bus.

The memory 53 stores an instruction or code, and when the instruction or code is run in the processor 51, the control apparatus is configured to:

obtain resource scheduling information of a neighboring cell of the first cell in a first time interval, where the resource scheduling information is used to represent a resource scheduling result of the neighboring cell in the first time interval;

determine an interference level of inter-cell interference of the first cell according to the obtained resource scheduling information in the first time interval;

measure an inter-cell interference value of the first cell in a second time interval, where the second time interval is later than the first time interval; and store the measured inter-cell interference value of the first cell in the second time interval by using the interference level as an index, where the interference level is determined according to the resource scheduling information in the first time interval.

In an implementation manner, when the instruction or code is run in the processor 51, the control apparatus is specifically configured to:

send a request message to a second base station, where cells managed by the second base station include the neighboring cell of the first cell; and receive the resource scheduling information of the neighboring cell of the first cell in the first time interval, where the resource scheduling information is sent by the second base station; or read resource scheduling information of a second cell in the first time interval, where the first base station manages the second cell, and the second cell is the neighboring cell of the first cell.

The resource scheduling result of the neighboring cell in the first time interval includes: a user is scheduled in a first resource location, or no user is scheduled in a first resource location, where the first resource location in the neighboring cell and the first resource location in the first cell denote a same resource location.

In an implementation manner, when the instruction or code is run in the processor 51, the control apparatus is specifically configured to:

determine the interference level of the inter-cell interference of the first cell according to a quantity of neighboring cells that have scheduled users in the first resource location; or determine the interference level of the inter-cell interference of the first cell according to a quantity of neighboring cells that have scheduled no user in the first resource location.

When the resource scheduling result of the neighboring cell in the first time interval is: a user is scheduled in the first resource location, and the scheduled user is a strong-interference user, in an implementation manner, when the instruction or code is run in the processor 51, the control apparatus is specifically configured to:

determine the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

In an implementation manner, when the instruction or code is run in the processor 51, the control apparatus is further configured to:

obtain resource scheduling information of the neighboring cell of the first cell in a third time interval, where the resource scheduling information is used to represent a resource scheduling result of the neighboring cell in the third time interval;

determine an interference level of inter-cell interference of the first cell according to the obtained resource scheduling information in the third time interval;

measure an inter-cell interference value of the first cell in a fourth time interval, where the fourth time interval is later than the third time interval; and store the measured inter-cell interference value of the first cell in the fourth time interval by using the interference level as an index, where the interference level is determined according to the resource scheduling information in the third time interval.

In an implementation manner, when the instruction or code is run in the processor 51, the control apparatus is further configured to:

when the interference level determined according to the resource scheduling information in the first time interval is the same as the interference level determined according to the resource scheduling information in the third time interval, calculate and store a statistic value of the inter-cell interference values of the first cell according to the measured inter-cell interference value of the first cell in the second time interval and the measured inter-cell interference value of the first cell in the fourth time interval; or delete the measured inter-cell interference value of the first cell in the second time interval, where the fourth time interval is later than the second time interval.

In addition, when the instruction or code is run in the processor 51, the control apparatus is further configured to:

obtain resource scheduling information of a neighboring cell of the first cell in a first time interval, where the resource scheduling information is used to represent a resource scheduling result of the neighboring cell in the first time interval;

determine an interference level of inter-cell interference of the first cell according to the obtained resource scheduling information in the first time interval; and read a stored and historically measured inter-cell interference value of the first cell according to the interference level that is determined according to the resource scheduling information in the first time interval; and estimate inter-cell interference of the first cell in a second time interval by using the read and historically measured inter-cell interference value of the first cell, where the second time interval is later than the first time interval.

In an implementation manner, the stored and historically measured inter-cell interference value of the first cell includes:

an inter-cell interference value of the first cell that is measured in one or more historical time intervals, where the inter-cell interference value is pre-stored in the device by using an interference level as an index, the interference level is the same as the interference level determined according to the resource scheduling information in the first time interval, and the one or more historical time intervals are all earlier than the second time interval; or a statistic value, calculated and stored according to inter-cell interference values of the first cell that are measured in multiple historical time intervals, of inter-cell interference values of the first cell, where the statistic value of the inter-cell interference values of the first cell is pre-stored in the device by using an interference level as an index, the interference level is the same as the interference level determined according to the resource scheduling information in the first time interval, and the multiple historical time intervals are all earlier than the second time interval.

In an implementation manner, when the instruction or code is run in the processor 51, the control apparatus is specifically configured to:

send a request message to a second base station, where cells managed by the second base station include the neighboring cell of the first cell; and receive the resource scheduling information of the neighboring cell of the first cell in the first time interval, where the resource scheduling information is sent by the second base station; or read resource scheduling information of a second cell, where the first base station manages the second cell, and the second cell is the neighboring cell of the first cell.

Specifically, the resource scheduling result of the neighboring cell in the first time interval includes: a user is scheduled in a first resource location, or no user is scheduled in a first resource location, where the first resource location in the neighboring cell and the first resource location in the first cell denote a same resource location.

In an implementation manner, when the instruction or code is run in the processor 51, the control apparatus is specifically configured to:

determine the interference level of the inter-cell interference of the first cell according to a quantity of neighboring cells that have scheduled users in the first resource location; or determine the interference level of the inter-cell interference of the first cell according to a quantity of neighboring cells that have scheduled no user in the first resource location.

Specifically, when the resource scheduling result of the neighboring cell in the first time interval is: a user is scheduled in the first resource location, and the scheduled user is a strong-interference user, in an implementation manner, when the instruction or code is run in the processor 51, the control apparatus is specifically configured to:

determine the interference level of the inter-cell interference of the first cell according to a quantity of neighboring cells that have scheduled strong-interference users in the first resource location, where the strong-interference user is determined according to cell quality of the neighboring cell, cell quality of the first cell, and a threshold by a base station that manages the neighboring cell, where the cell quality of the neighboring cell is measured by user equipment.

In an implementation manner, when the instruction or code is run in the processor 51, the control apparatus is further configured to:

calculate a signal to interference plus noise ratio of the first cell in the second time interval in the first resource location according to the estimated inter-cell interference of the first cell in the second time interval.

In an implementation manner, when the instruction or code is run in the processor 51, the control apparatus is further configured to:

determine, according to the calculated signal to interference plus noise ratio of the first cell in the second time interval, whether to schedule a user in the first resource location of the first cell; or determine, according to the calculated signal to interference plus noise ratio of the first cell, whether to adjust a modulation and coding scheme of a user scheduled in the first resource location of the first cell.

It should be noted that the control apparatus obtains the resource scheduling information of the neighboring cell of the first cell in the first time interval, where the resource scheduling information is used to represent a resource scheduling result of the neighboring cell in the first time interval; after determining the interference level of inter-cell interference of the first cell according to the obtained resource scheduling information in the first time interval, reads the stored and historically measured inter-cell interference value of the first cell according to the interference level that is determined according to the resource scheduling information in the first time interval; and starts execution of the solution in step 103 to step 104 in Embodiment 1 of the present invention if the historically measured inter-cell interference value of the first cell does not exist, where the inter-cell interference value corresponds to the interference level determined according to the resource scheduling information in the first time interval, or triggers execution of the solution in step 203 to step 204 in Embodiment 2 of the present invention if the historically measured inter-cell interference value of the first cell exists, where the inter-cell interference value corresponds to the interference level determined according to the resource scheduling information in the first time interval. That is, a mapping relationship that is stored in the control apparatus and that is between the interference level determined according to the resource scheduling information in the first time interval and the historically measured inter-cell interference value of the first cell is obtained in a long-term learning process, so that subsequent estimation of the inter-cell interference of the first cell is more convenient.

In this way, the control apparatus determines an interference level of inter-cell interference according to resource scheduling information of a neighboring cell of a cell managed by the control apparatus, and by using the interference level as an index, stores real inter-cell interference that is obtained subsequently by means of measurement. That is, the control apparatus can establish and store a correlation between the interference level of the inter-cell interference and a real inter-cell interference value that is obtained subsequently by means of measurement. As time goes by, there may be multiple real inter-cell interference values correlated with an interference level; and when the foregoing optional step is performed, a statistic value of more accurate inter-cell interference values correlated with the interference level can be obtained, or a latest inter-cell interference value is always reserved. Predictably, based on the stored correlation between the interference level and the real inter-cell interference value obtained by means of measurement, the control apparatus can quickly and accurately predict a future inter-cell interference value by determining the interference level of the inter-cell interference, so as to relieve impact caused by fluctuation of the inter-cell interference on SINR estimation accuracy.

Embodiment 6

Embodiment 6 of the present invention provides a base station. The base station is configured to manage a first cell, and the base station is configured to have functions described in Embodiment 1 to Embodiment 5 of the present invention. Specific content of this embodiment is the same as the content described in Embodiment 1 to Embodiment 5 of the present invention, and is not described herein any further.

Embodiment 7

In Embodiment 7 of the present invention, a computer program product is provided. The computer program product includes computer program code. When the computer program code is run by a processing unit, the processing unit executes the content described in Embodiment 1 to Embodiment 5 of the present invention, and the content is not repeated herein any further.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for handling inter-cell interference for use with a first base station to manage a first cell, the method comprising:
   obtaining resource scheduling information of a neighboring cell of the first cell in a first time interval, wherein the resource scheduling information is used to represent a resource scheduling result of the neighboring cell in the first time interval;

determining an interference level of inter-cell interference of the first cell according to the obtained resource scheduling information in the first time interval;

measuring an inter-cell interference value of the first cell in a second time interval, wherein the second time interval is later than the first time interval; and storing the measured inter-cell interference value of the first cell in the second time interval by using the interference level as an index, wherein the interference level is determined according to the resource scheduling information in the first time interval.

2. The method according to claim 1, wherein obtaining resource scheduling information of a neighboring cell of the first cell in a first time interval comprises:

sending a request message to a second base station, wherein cells managed by the second base station comprise the neighboring cell of the first cell, and receiving the resource scheduling information of the neighboring cell of the first cell in the first time interval, wherein the resource scheduling information is sent by the second base station; or reading resource scheduling information of a second cell in the first time interval, wherein the first base station manages the second cell, and the second cell is the neighboring cell of the first cell.

3. The method according to claim 1, wherein:

the resource scheduling result of the neighboring cell in the first time interval comprises: a user is scheduled in a first resource location, or no user is scheduled in a first resource location, wherein the first resource location in the neighboring cell and the first resource location in the first cell denote a same resource location; and determining an interference level of inter-cell interference of the first cell according to the obtained resource scheduling information in the first time interval comprises:

determining the interference level of the inter-cell interference of the first cell according to a quantity of neighboring cells that have scheduled users in the first resource location, or determining the interference level of the inter-cell interference of the first cell according to a quantity of neighboring cells that have scheduled no user in the first resource location.

4. The method according to claim 3, wherein when the resource scheduling result of the neighboring cell in the first time interval is: a user is scheduled in the first resource location and is a strong-interference user, determining the interference level of the inter-cell interference of the first cell according to a quantity of neighboring cells that have scheduled users in the first resource location comprises:

determining the interference level of the inter-cell interference of the first cell according to a quantity of neighboring cells that have scheduled strong-interference users in the first resource location, wherein the strong-interference user is determined according to cell quality of the neighboring cell, cell quality of the first cell, and a threshold by a base station that manages the neighboring cell, wherein the cell quality of the neighboring cell is measured by user equipment.

5. The method according to claim 1, further comprising:

obtaining resource scheduling information of the neighboring cell of the first cell in a third time interval, wherein the resource scheduling information is used to represent a resource scheduling result of the neighboring cell in the third time interval;

determining an interference level of inter-cell interference of the first cell according to the obtained resource scheduling information in the third time interval;

measuring an inter-cell interference value of the first cell in a fourth time interval, wherein the fourth time interval is later than the third time interval; and storing the measured inter-cell interference value of the first cell in the fourth time interval by using the interference level as an index, wherein the interference level is determined according to the resource scheduling information in the third time interval.

6. The method according to claim 5, wherein when the interference level determined according to the resource scheduling information in the first time interval is the same as the interference level determined according to the resource scheduling information in the third time interval, the method further comprises:

calculating and storing a statistic value of the inter-cell interference values of the first cell according to the measured inter-cell interference value of the first cell in the second time interval and the measured inter-cell interference value of the first cell in the fourth time interval; or deleting the measured inter-cell interference value of the first cell in the second time interval, wherein the fourth time interval is later than the second time interval.

7. A control apparatus for use with a first base station for managing a first cell, the control apparatus comprising:

a processor coupled to a communications link; and a memory coupled to the communication link, the memory configured to store code which, when executed by the processor, causes the control apparatus to:

obtain resource scheduling information of a neighboring cell of the first cell in a first time interval, wherein the resource scheduling information is used to represent a resource scheduling result of the neighboring cell in the first time interval, determine an interference level of inter-cell interference of the first cell according to the obtained resource scheduling information in the first time interval, measure an inter-cell interference value of the first cell in a second time interval, wherein the second time interval is later than the first time interval, and store the measured inter-cell interference value of the first cell in the second time interval by using the interference level as an index, wherein the interference level is determined according to the resource scheduling information in the first time interval.

8. The apparatus according to claim 7, wherein to obtain resource scheduling information of a neighboring cell of the first cell in a first time interval, the code, when executed by the processor, causes the control apparatus to:

send a request message to a second base station, wherein cells managed by the second base station comprise the neighboring cell of the first cell, and receive the resource scheduling information of the neighboring cell of the first cell in the first time interval, wherein the resource scheduling information is sent by the second base station; or read resource scheduling information of a second cell in the first time interval, wherein the first base station manages the second cell, and the second cell is the neighboring cell of the first cell.

9. The apparatus according to claim 7, wherein:
the resource scheduling result of the neighboring cell in the first time interval comprises:
a user is scheduled in a first resource location, or no user is scheduled in a first resource location, wherein the first resource location in the neighboring cell and the first resource location in the first cell denote a same resource location; and
to determine an interference level of inter-cell interference of the first cell according to the obtained resource scheduling information in the first time interval, the code, when executed by the processor, causes the control apparatus to:
determine the interference level of the inter-cell interference of the first cell according to a quantity of neighboring cells that have scheduled users in the first resource location, or
determine the interference level of the inter-cell interference of the first cell according to a quantity of neighboring cells that have scheduled no user in the first resource location.

10. The apparatus according to claim 9, wherein when the resource scheduling result of the neighboring cell in the first time interval is: a user is scheduled in the first resource location and is a strong-interference user, to determine the interference level of the inter-cell interference of the first cell according to a quantity of neighboring cells that have scheduled users in the first resource location, the code, when executed by the processor, causes the control apparatus to:
determine the interference level of the inter-cell interference of the first cell according to a quantity of neighboring cells that have scheduled strong-interference users in the first resource location, wherein the strong-interference user is determined according to cell quality of the neighboring cell, cell quality of the first cell, and a threshold by a base station that manages the neighboring cell, wherein the cell quality of the neighboring cell is measured by user equipment.

11. The apparatus according to claim 7, wherein the code, when executed by the processor, causes the control apparatus to:
obtain resource scheduling information of the neighboring cell of the first cell in a third time interval, wherein the resource scheduling information is used to represent a resource scheduling result of the neighboring cell in the third time interval;
determine an interference level of inter-cell interference of the first cell according to the obtained resource scheduling information in the third time interval;
measure an inter-cell interference value of the first cell in a fourth time interval, wherein the fourth time interval is later than the third time interval; and
store the measured inter-cell interference value of the first cell in the fourth time interval by using the interference level as an index, wherein the interference level is determined according to the resource scheduling information in the third time interval.

12. The apparatus according to claim 11, wherein when the interference level determined according to the resource scheduling information in the first time interval is the same as the interference level determined according to the resource scheduling information in the third time interval, the code, when executed by the processor, causes the control apparatus to:
calculate and store a statistic value of the inter-cell interference values of the first cell according to the measured inter-cell interference value of the first cell in the second time interval and the measured inter-cell interference value of the first cell in the fourth time interval; or
delete the measured inter-cell interference value of the first cell in the second time interval, wherein the fourth time interval is later than the second time interval.

\* \* \* \* \*